Figure 1:
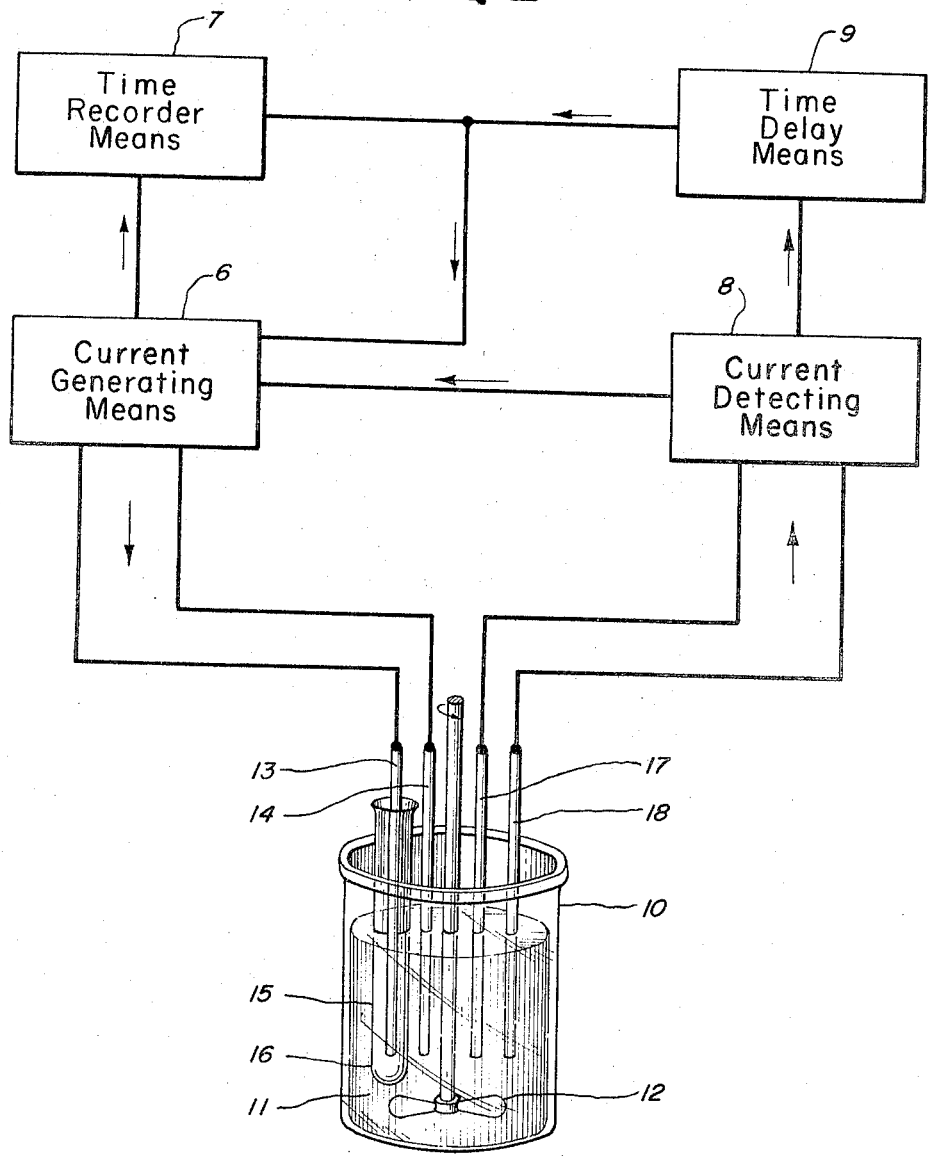

Feb. 21, 1967    LE ROY W. LIESCH    3,305,468
AUTOMATIC TITRATION APPARATUS
Filed Dec. 12, 1962    2 Sheets-Sheet 1

INVENTOR.
Le Roy W. Liesch
BY
Gary Desmond Saki
Attys.

Feb. 21, 1967  LE ROY W. LIESCH  3,305,468
AUTOMATIC TITRATION APPARATUS
Filed Dec. 12, 1962  2 Sheets-Sheet 2

INVENTOR.
Le Roy W. Liesch
BY
Gay Desmond Baker
Attys.

United States Patent Office 3,305,468
Patented Feb. 21, 1967

3,305,468
AUTOMATIC TITRATION APPARATUS
Le Roy W. Liesch, Chicago, Ill., assignor to Velsicol Chemical Corporation, Chicago, Ill., a corporation of Illinois
Filed Dec. 12, 1962, Ser. No. 244,048
5 Claims. (Cl. 204—195)

This invention relates generally to the determination of the composition of materials in a chemical process, and more particularly to the determination of the halogen number of a material by means including automatic titration apparatus.

Titrations are usually performed by adding increments of a liquid titrant reactable with the titrand from a graduated buret, until an end point is reached. An end point is the point of complete reaction of the titrant with the titrand or a portion or grouping of the titrand. The end point is commonly located by visual observation, for example, by noting a color change occurring in a chemical reagent, called an indicator, upon reaction of excess titrant after the end point has been reached.

Manual titration from a buret is a slow, laborious procedure, oftentimes requiring numerous, rapid titrations, frequently performed by non-skilled or semi-skilled operators, and thus is not particularly suited for use in process and quality control. In recent years specialized apparatus has been developed to eliminate the manual titration from a buret, by installing automatic buret valves; and to obviate the visual determination of the end point by monitoring the electrical conductivity of a solution, e.g., potentiometer end-point determination; and by other related apparatus and methods. However, attempts to provide a completely automatic apparatus for the determination of composition, such as the halogen number, by titration have been unsuccessful.

The halogen number is a measurement of the double bond unsaturation in an organic chemical and is determined by reacting a halogen gas with the unsaturated double bond under controlled conditions to avoid replacing any substituent, such as a hydrogen atom, with the halogen. Attempts to devise an automatic titration apparatus to determine helogen numbers have generally been unsuccessful due to the difficulty of supplying the halogen gas in incremental, accurately measurable quantities, and the detection of the end-point without prematurely ending the titration or overshooting the end-point. The difficulty with previous apparatus using potentiometric, amperometric, and related detection means has been that unless immediate reaction occurred the excess titrant temporarily present in the titrand would cause the detector to signal the end-point, and the titration would prematurely end. Premature end-point detection often occurs with determinations based on slow reacting materials.

Therefore, it is a primary object of the present invention to provide an apparatus for automatic titration to determine the halogen number of a material.

It is another object of this invention to provide an apparatus for automatic titration which provides for the constant supply and accurate measurement of the titrant.

It is another object of this invention to provide a automatic titration apparatus which automatically supplies and accurately measures the supply of a gaseous titrant.

Still another object of this invention is to provide an automatic titration apparatus with means for automatically distinguishing the true end-point from a premature end-point indication, and continuing the titration until the true end-point is reached.

The foregoing and other objects of the present invention are achieved in one embodiment comprising means for coulometrically generating a titrant; means for amperometrically detecting the end-point of the titration; and means for halting the coulometric generating means for a predetermined period after a first end-point indication is provided and determining during this period if the end-point indication signifies the true end-point. If not, at the end of the predetermined period the titration process is recommenced as the coulometric generating means is restarted, and this cycle is repeated until the end-point indication coincides with the true end point, at which time the coulometric generating means is halted without re-starting. Means is also provided for recording the time during which the coulometric generating means is functioning, thus to indicate the amount of titrant produced.

Figure 2:
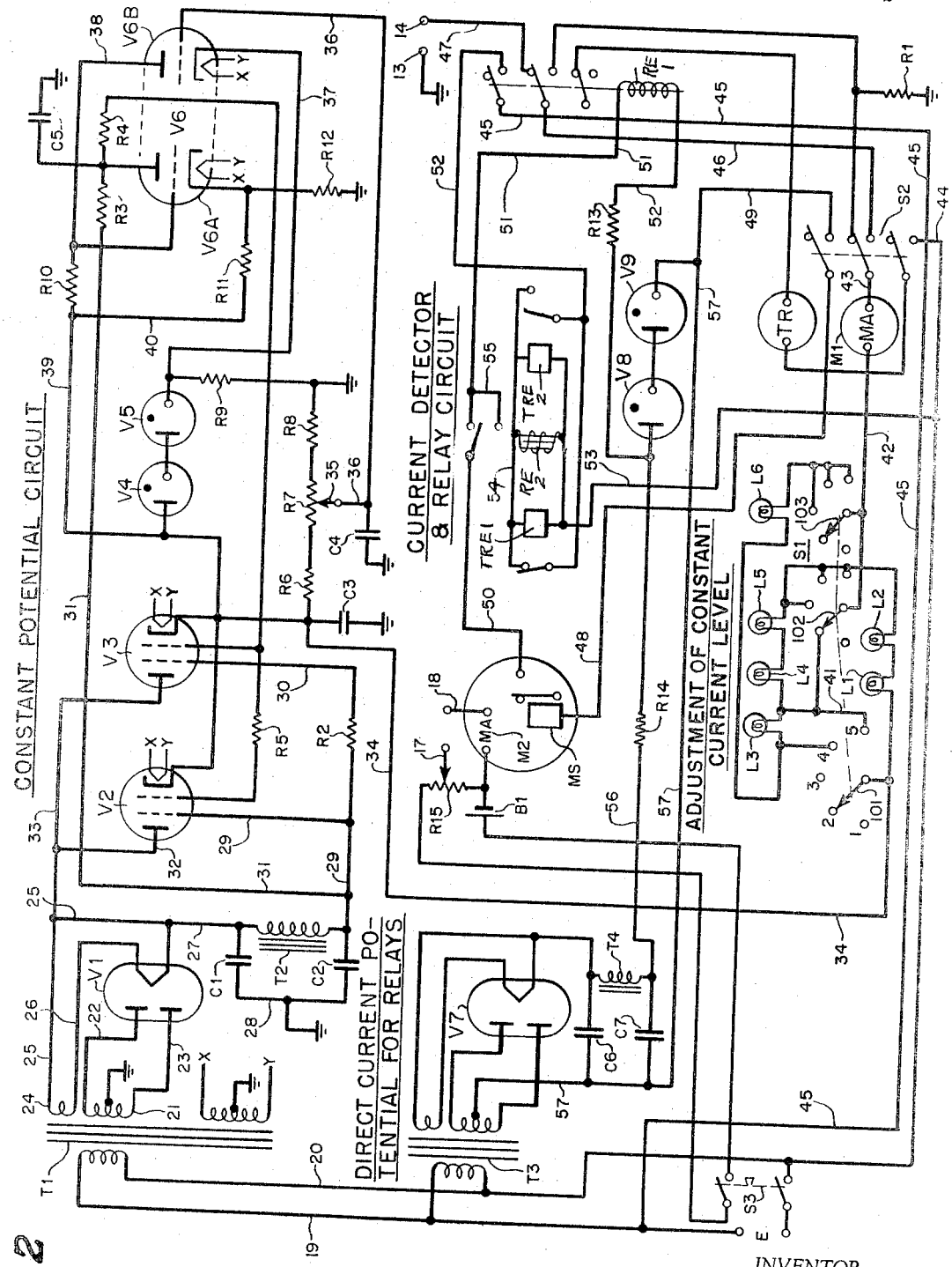

Now in order to acquaint those skilled in the art with the best mode contemplated for making and using the invention, a description thereof is set forth in connection with the accompanying drawing, in the several figures of which like reference numerals identify like elements, and in which:

FIG. 1 is a block diagram, partly in illustrative form, depicting the system of one embodiment of the invention; and FIG. 2 is a schematic diagram showing in detail circuit components set out in block form in FIG. 1.

As shown in FIG. 1, a titrating vessel 10 is provided to contain the liquid titrand and the liquid titration reagent, which comprise the titration solution 11. An agitating means 12 is positioned in vessel 10. Titrating vessel 10 may be a cylindrical vessel, such as a beaker or glass tumbler and may be constructed of any inert, non-conductive material. Titrating vessel 10 is preferably formed from an inert plastic, such as a polypropylene, but the beaker may be formed from glass. Agitating means 12 may suitably be a glass stirring paddle on a glass rod connected to an electric motor (not shown), or preferably is a glass or plastic sealed magnetic stirrer.

Still referring to FIG. 1, a first pair of electrodes 13 and 14 is partially disposed in solution 11 within the vessel 10. Electrodes 13 and 14 are constructed of a noble metal such as platinum, palladium, gold, and the like. The electrodes 13 and 14 are preferably constructed from platinum wire. Electrode 13 is isolated from electrode 14 by means of a glass tube 15 surrounding electrode 13 and sealed at its lower end by a fritted glass disc 16. A second pair of electrodes 17 and 18 is also partially disposed in solution 11 within vessel 10. Electrodes 17 and 18 can be constructed of the same material as electrodes 13 and 14, or any other material selected from the group defined above, and are preferably constructed from platinum wire.

Referring again to FIG. 1, the first pair of electrodes 13 and 14 is coupled to a current generating means 6, which provides a relatively high constant potential and constant current signal across the first pair of electrodes 13 and 14. Current generating means 6 is coupled to time recording means 7 such that the time during which energy it supplied to the first pair of electrodes 13 and 14 is recorded. The second pair of electrodes 17 and 18 is coupled to current detecting means 8. A constant first current of relatively low level is normally maintained across electrodes 17 and 18 as the reaction takes place and is indicated by the current detecting means. The current detecting means 8 is coupled to the current generating means 6 and to time delay means 9, which in turn is coupled to the current generating means 6 and the time recording means 7.

In utilizing the apparatus of the present invention, a titrand, i.e. the sample to be titrated, is placed in titrating vessel 10. A titration reagent, normally unreactive with the titrand and releasing a titrant reactive with the titrand or the substituent or group thereof to be measured upon provision of a titrant by passage of an electric current, is added to titrating vessel 10. A suitable solvent may also be added if desired. The titrand, titration reagent and solvent comprise the titrating solution 11. The titration is started by energizing the current generating means to provide energy at a relatively high constant potential and constant current across the first pair of electrodes 13 and 14. The titrant, reactable with the titrand or group or substituent thereof, is released from the titration reagent in a quantity related to the amount of current passing between the first pair of electrodes 13 and 14. By maintaining a constant level of current across the first pair of electrodes 13 and 14, only the time during which current is supplied need be measured to obtain the quantity of electricity conventionally measured in coulombs, supplied to the titration solution 11. This time energy is recorded by the time recording means 7.

The titrant released, the titration reagent reacts with the titrand or group or substituent thereof. During this reaction only a relatively low first current appears across the second pair of electrodes 17 and 18. This first current is insufficient to operate the control elements of the current detecting means 8, which is preset to operate when the detected current reaches a higher second current value, i.e., the relatively high level second current. Thus during the titration reaction the current detecting means 8 is in its unoperated state.

At the completion of the reaction, i.e., the end-point, excess titrant appears in the titration solution 11. The excess titrant readily reacts with electrons in solution 11 in the vicinity of the second pair of electrodes 17 and 18. The reaction of excess titrant with the electrons causes a relatively high level second current to flow across the second pair of electrodes 17 and 18, which is detected by the current detecting means 8. This relatively high second current "triggers" or operates the current detecting means. Responsive to this operation, current detecting means 8 effects the deenergization of current generating means 6, halting the supply of energy to the first pair of electrodes 13 and 14. In its operation current detecting means 8 also effects the deenergization of time recording means 7, halting the time-recording operation.

At this point an end-point has been indicated and in response the titration has been halted. It will be readily observed that the presence of excess titrant in the titration solution provided the end-point indication and halted the titration. It is noted that excess titrant could also be present, and erroneously signal the end-point, due to other causes. For example, excess titrant could be present when the reaction between the titrant and the titrand or group or substituent thereof occurs slowly, which is common to many reactions, particularly as the reaction nears completion. Thus, if for any reason other than completion of reaction, excess titrant is present in titration solution 11, an end-point indication would be prematurely provided.

The apparatus of the present invention provides for the detection and correction of premature end-point indications. Upon operation of the current detecting means 8 by detection of a relatively high level second current across the second pair of electrodes 17 and 18, and consequent deenergization of current generating means 6 and time recording means 7, a heretofore deenergized time delay means 9 is energized by the current detecting means. The time delay means maintains both current generating means 6 and time recording means 7 in their deenergized states for a predetermined time period. During this period the excess titrant will react with the titrand or group or substituent thereof, if the titration reaction has not been completed, removing the excess titrant from the reaction solution 11. When excess titrant is no longer present the relatively high level second current ceases to appear across the second pair of electrodes 17 and 18, and only relatively low level first current will be detected by the current detecting means 8, causing the latter to change to its unoperated state. However, if the reaction has been completed, the relatively high level second current will be detected throughout the predetermined time period.

At the end of the predetermined time period, if only the relatively low level first current is detected by the current detecting means 8, then the current generating means 6 and time recording means 7 are energized and the titration is continued. The current passing across the first pair of electrodes 13 and 14 releases titrant, until a second end-point indication is provided, by excess titrant being present in titration solution 11. The detection process is then repeated at the termination of the second time delay period. The entire control cycle is repeated until the current detecting means 8 remains energized at the termination of the predetermined time period. Such operation signifies that the titration is complete, i.e. the true end-point has been reached. At this time, the current generating means 6 and time recording means 7 are deenergized without re-cycling.

The amount of titrant generated and passed into the titration solution 11 is readily determined by Faraday's Law, which in effect states that one equivalent of titrant will be formed by the reaction of 96,500 coulombs, where one coulomb is equal to the flow of one ampere for one second. The composition or specific property value sought can then be calculated from the quantity of titrant consumed by methods common to the art.

Referring to FIG. 2, the circuit shown comprises two main independent circuits, the generating circuit and the current detection circuit. The generating circuit can be further divided into two sub-circuits, a constant potential circuit and the constant current circuit. The main elements of the constant potential circuit shown in FIG. 2 are: power transformer T1, full wave rectifier tube V1, filter choke T2, tetrode tubes V2 and V3, voltage regulator tubes V4 and V5, and dual-triode tube V6, together with various resistors and capacitors. The constant current sub-circuit shown therein is comprised of current selector switch S1, lamps L1–L6, milliammeter M1, on-off switch S2, resistance R1, time recorder TR, relay RE1, and first pair of electrodes 13 and 14.

The current detection circuit may also be further divided into two sub-circuits, the current detector and relay sub-circuit and the direct current potential source for the relays.

The main elements of the current detector and relay sub-circuit are the second pair of electrodes 17 and 18, battery B1, variable resistance R15, microammeter M2, microammeter relay switch MS, time delay relays TRE1 and TRE2, and relay RE2. The remaining circuit in FIG. 2 is a direct current potential source for the relays and is comprised of power transformer T3, full wave rectifier tube V7, voltage regulator tubes V8 and V9, filter choke T4 and various resistances and capacitances.

The operation of the titrator apparatus embodied in FIG. 2, is started by closing switch S3. Switch S3 is preferably a double pole switch so that both the alternating current energy from source E is admitted into the circuit and the direct current energy from battery B1 is admitted to the current detection circuit at the same time. However, switch S3 may also be two single pole switches (not shown).

The closing of switch S3 passes alternating current energy from source E over conductors 19 and 20 to primary windings of transformers T1 and T3. Secondary winding 21 of transformer T1 supplies high voltage alternating energy over leads 21 and 22 to the plates of rectifier tube V1. The center tap of winding 21 is grounded. Secondary winding 24 of transformer T1 is connected through leads 25 and 26 to the cathode of rectifier tube V1 to heat the cathode.

The rectifier tube V1 changes the alternating current from transformer T1 into a rippled high potential direct current signal, which can be considered as having alternating and direct current components. The rippled direct current output signal of tube V1 is obtained from the cathode and is conducted through lead 27 to capacitance C1 and filter choke T2. Capacitance C1 allows a significant portion of the alternating current component of the rippled direct current signal to pass to ground through lead 28, but blocks the now partially filtered current component. This partially filtered direct current component is passed through filter choke T2 which removes most of the remaining ripple from the direct-current component. The additionally filtered direct current component is applied to capacitance C2 by lead 29. Capacitance C2 passes substantially all of the remaining alternating current component to ground, and blocks the direct current component. Thus, the signal appearing on lead 29 is a high voltage, direct current signal having little, if any, ripple.

The remaining components of the constant potential sub-circuit serve to compensate for any fluctuations in the generating current caused by changes in the load or in the alternating current source. While one or more triodes or other recognized voltage fluctuation compensation circuits may be used to perform this function, it is preferred to utilize the combination of tetrode tubes, voltage regulator tubes and triode tubes illustrated in FIG. 2. Referring in detail to that figure, the direct current from filter choke T2 and capacitance C2 passes over lead 29 to the screen grid of tetrode V2 and, through lead 29, resistance R2 and lead 30 to the screen grid of tetrode V3. The cathodes of tetrodes V2 and V3, and dual triode V6, are indirectly heated by filaments, designated X and Y, connected to the third secondary winding, also designated X, Y, of power transformer T1. Although one triode, tetrode, or other amplification device can be used alone to amplify the current change, it is preferred to utilize tetrodes V2 and V3 in parallel in order to handle the high potential in the circuit. The direct current from filter choke T2 and capacitance C2 also passes through lead 31 and resistance R3 to the plate of the left triode V6A of dual-triode tube V6, and through resistance R4 to the control grid of tetrode V3, and then through resistance R5 to the control grid of tetrode V2. The plates or tetrodes V2 and V3 are energized over conductor 33 by a direct current signal. Thus tubes V2 and V3 pass current to their cathodes, which are connected by lead 34 to the current selector switch S1 and hence to the remainder of the apparatus.

If a fluctuation in the voltage occurs in the load, it will be carried by lead 34 to capacitance C3, which conducts any alternating current component to ground. Lead 34 conducts the direct current component to resistances R6, R7, and R8. Compensation for this fluctuation is made by a comparison at point 35 of the voltage in R6, R7, and R8 with the standard reference voltage provided by voltage regulator tubes V4 and V5 through resistances R9. The voltage unbalance at point 35 is conducted by lead 36 to capacitance C4 which conducts any alternating current component to ground, and blocks the direct current component. Lead 36 conducts the direct current component to the control grid of the right triode V6B of dual triode V6. The cathode of the right triode V6B is maintained at a constant voltage by connection through lead 37 to the cathode of the voltage regulator tube V5. The unbalance or difference voltage applied to the control grid of right triode V6B is amplified by that tube and the amplified difference signal is passed from the plate of tube V6B through lead 38 to the control grid of left triode V6A, through resistance R10 and lead 39 to the cathodes of tetrode tubes V2 and V3, and through resistance R10, lead 40 and resistance R11 to the cathode of left triode V6A. The cathode of left triode V6A is also connected to ground through resistance R12. The amplified difference voltage conducted to the control grid of left triode tube V6A and to the cathode of that tube is further amplified in this stage. The further amplified difference voltage is passed from the plate of left triode tube V6A and conducted through resistance R3, lead 31, and lead 29 to the control grid of tetrode V2, and resistor R2 and lead 30 to the control grid of V3. This further amplified difference voltage is also applied to capacitance C5, which conducts any alternating current component to ground and blocks the direct current component. The direct current component is then conducted through resistance R4 to the control grid of tetrode V3 and through resistance R5 to the control grid of tetrode V2.

Upon application of the amplified difference voltage signal to the screen and control grids of tetrodes V2 and V3, a corrected voltage is obtained at their cathodes which compensates for the fluctuation in the remainder of the apparatus and maintains a constant voltage in the system. This corrected cathode voltage is conducted through lead 34 to the remainder of the circuit.

A signal having a current of constant level is passed from the constant voltage circuit over lead 34 to current selector switch S1, which allows a suitable constant current value to be selected by the operator. It is manifest that if the titration apparatus is to be used in only one type of titration, only one current value is required which can be obtained by proper selection of the components and adjustment of the apparatus, eliminating the current selector switch S1 and all but one of the lamps L1-L6. However, where the apparatus is to be used for various titrations it is desirable to be able to readily select a current which will generate the titrant at a reasonable rate. Therefore, an arrangement such as the current selector switch S1 and lamps L1-L6 is employed. This circuit operates on the principle that the resistance of a hot wire, such as the glowing filament of a lamp, or a plurality of lamps, can be used to regulate the level of the constant current. Thus, the effective resistance of the lamps placed in series or parallel in the circuit regulates the constant current in the remainder of the circuit.

Referring to FIG. 2, the constant voltage from the previously described sub-circuit is connected by lead 34 to the rotor 101 of the first gang of selector switch S1, and over lamps L1 and L2 to positions 3, 4, and 5 of the second gang of the switch. Positions 1-3 of the first gang; position 1 of the second gang; and positions 1-4 of the third gang are not connected to any part of the circuit. Thus, when the switch S1 is in the 1 position, no current flows through the circuit. When switch S1 is in the 2 position, as illustrated, current flows from lead 34 through lamps L1, L2, L5 and L4, lead 41, rotor 102 and lead 42 to one side of milliammeter M1. Hence, when selector switch S1 is in position 2, the current is reduced to a low value in relation to the load of the four lamps connected in series.

When selector switch S1 is in position 3, the current in lead 34 is conducted through lamps L1 and L2, rotor 102, and lead 42 to milliammeter M1. In position 3, with two lamps L1 and L2 connected in series, the current is reduced from the maximum value but is of a value higher than the value obtained in position 2.

Similarly, when selector switch S1 is in the 4 position the current in lead 34 flows through lamps L1 and L2 to rotor 102, and hence over lead 42 to milliammeter M1; and in parallel through rotor 101, lamps L3, L4 and L5 to rotor 102, and then through lead 42 to milliammeter M1. Thus the resultant current is still higher than when switch S1 is in the previous position. Lastly, when switch S1 is in position 5, the current from lead 34 flows through lamps L1 and L2, over rotor 102 and lead 42 to milliammeter M1. At the same time the current from lead 34 flows in parallel with the previous two lamps, through rotor 101, lead 41 and lamps L4 and L5, rotor 102 and lead 42 to milliammeter M1; and also flows in parallel with the two previously described paths through rotor 101, lead 41, lamps L3 and L6, rotor 103 and lead 42 to milliammeter M1. Thus, when the switch is in position 5, the current is still greater than in the previous positions since the current travels through three parallel paths of 2 lamps each.

Milliammeter M1 indicates the current passing through lead 42 after having been regulated by the appropriate combination of lamps L1–L6, which current is passed (during titration) over conductor 43, the center contacts of switch S2, conductor 46, center contacts of relay RE1, and conductor 47 to electrode 14. Switch S2 is shown in FIG. 2 as a three-pole switch, although other switch devices common to the art may be used in its place. When switch S2 is in the off position, the current from milliammeter M1 is conducted over resistance R1 to ground. Resistance R1 acts as a dummy load so that the current flow remains constant although titration is not being performed. The third pole of switch S2 allows alternating current energy from source E to be supplied to timer TR through leads 44 and 45. When switch S2 is in the off position, alternating current energy from source E is not conducted to timer TR, but when switch S2 is closed, alternating current energy is conducted to timer TR, subject however, to the position of relay RE1.

To begin the titration, switch S2 is closed, passing current from lead 43 over the second pole of switch S2 and lead 46 to the second pole of relay RE1. Relay RE1 is preferably a three pole relay as illustrated in FIG. 2, but may be other relay or switching means which will accomplish the same result. When relay RE1 is unoperated, as shown, current from lead 46 flows through the second pole of relay RE1 and lead 47 to electrode 14 of the first pair of electrodes disposed in titrating vessel 10. The potential at electrode 14 with respect to that at electrode 13 releases titrant from the titration reagent. Electrode 13 is grounded to complete the constant level current circuit.

The initial closing of switch S1 also applies a portion of the potential from battery B1, of a value determined by the setting of variable resistance R15 to appear across microammeter M2 and electrodes 17 and 18. Microammeter M2 detects only the low level first current appearing across electrodes 17 and 18 during the reaction of titrant with the titrand or group or substituent thereof. Microammeter switch MS, which may be mechanically or electronically closed by microammeter M2, is of the latching type, i.e., the switch is operated and locks closed upon a signal from microammeter M2 and remains closed until current ceases to flow through the switch. Microammeter switch MS is normally in its open position when microammeter M2 detects only the low level first current. One terminal of microammeter switch MS is connected through lead 48, the first pole of switch S2, which is closed during the titration, lead 49, and hence to the cold cathode of voltage regulator tube V9. The other lead of microammeter switch MS is connected through lead 50 to the first pole of relay RE2 which in its normal operating position connects lead 50 over lead 51 to the power coil of relay RE1. The other side of the power coil of relay RE1 is connected through lead 52 and resistance R13 to the plate of voltage regulator tube V8. Thus, during the titration reaction, microammeter switch MS is open to prevent the application of operating potential across the winding of relay RE1, which permits passage of current and generation of titrant at electrodes 13 and 14 by holding RE1 in its open, normal position.

Upon an excess of titrant appearing in titration solution 11, the level of the current passing between electrodes 17 and 18 increases until a preselected higher level second current is reached. At this point microammeter M2 effects the closure of microammeter switch MS, completing the circuit including leads 48 and 50, allowing current to flow through the coil of relay RE1, which then operates, simultaneously cutting off the flow of current from leads 46 and 47 to electrodes 13 and 14 and shunting the current through resistance R1 to ground, also cutting off the supply of alternating current energy from E to the timer TR and thus halting the recording of generation time, and passing alternating current energy from E through leads 45 and 52 to thermodelay relays TRE1 and TRE2. The return lead from the thermodelay relays connects with E through leads 53 and 44. Upon energization of the thermodelay relay TRE1 and TRE2 the relays are heated for a predetermined time.

As heretofore stated, the apparent excess of titrant detected in titration solution 11 may be due to causes other than the completion of titration. Therefore, the apparatus must next determine whether the apparent endpoint is the true end-point. This determination is automatically performed by allowing sufficient time for the excess titrant to react, if such reaction is still possible. The time period is determined by the two thermodelay relays TRE1 and TRE2, the former normally in the closed position and the latter normally open, as illustrated in FIG. 2.

Thermodelay relay TRE1 is heated by alternating current energy from source E through leads 52 and 53, in a circuit controlled by the first pole of relay RE1. After the predetermined time period, relay TRE1 opens and causes a momentary interruption in line 54, which cuts off the current to the power coil relay RE2, which is normally closed, but now opens due to the loss of energy to its power coil. This deenergization of relay RE2 opens lines 50 and 51 for a fraction of a second, that is, for the time required for the relay RE2 to move from closed to open. During this short interval, current no longer flows through lead 50 and therefore no current flows through microammeter switch MS, unlatching this switch. If the excess titrant in solution 11 has reacted with the titrand or portion or substituent thereof, then the higher level second current no longer flows between electrodes 17 and 18, and since the microammeter M2 will then respond only to the lower level first current, the unlatched microammeter switch MS will swing away from the contact point and remain open. However, if the excess titrant has not reacted, the microammeter M2 will detect the higher level second current flowing between electrodes 17 and 18, holding the unlatched microammeter switch MS closed against the contact point, affording a complete circuit from lead 51 through short lead 55 when RE2 opens, closing RE1 and preventing further titration.

During the extremely short time interval when RE1 is moving from its closed position to its open position, and microammeter switch MS is unlatched, relay RE1 is deenergized and the relay releases, allowing current to pass from lead 46 to lead 47 and hence to the titrant generation electrode 14, and allowing alternating current energy from source E to pass through timer TR. However, this time interval exists only when relay RE2 is passing from contact with main lead 51 to contact with short lead 55 and is so brief that only a negligible amount of titrant generation occurs, and an almost unnoticeable effect on the timer TR is permitted.

While thermodelay relay TRE1 is being heated when microammeter switch MS is first closed, thermodelay relay TRE2 is also being heated. However, thermodelay relay TRE2 is set for a longer heating period and accumulates heat, whereas thermodelay relay TRE1 dissipates heat readily. Thus, each time relay TRE1 is heated, relay TRE2 accumulates additional heat until sufficient heat is accumulated to close the relay, preventing line 51 from being interrupted and unlatching microammeter switch MS, effecting a permanent cessation of the particular titration process.

If microammeter switch MS is held open when relay RE2 closes into contact with lead 55, lead 50 is interrupted at the switch MS, and the winding of relay RE1 is no longer energized. Relay RE1 releases and permits the titration to continue by generation of titrant as current passes between electrodes 13 and 14 and energizes timer TR. Titration continues until excess titrant is detected in solution 11, and the process is repeated.

When microammeter switch MS is held closed by a signal from the microammeter M2 after expiration of the predetermined time period controlled by thermodelay relay TRE1, and relay RE2 opens to interrupt leads 50 and 51, the relay RE2 closes, completing the circuit of leads 49, 48, 50, 51 and 52 to the coil of relay RE1, which operates and again stops the titration by interrupting lines 46 and 47 to electrode 14 and line 45 to timer TR. The closing of relay RE1 also connects lines 45 and 47, providing energy to thermodelay relays TRE1 and TRE2. Thermodelay relay TRE1 continues to alternately heat up and open, and then cool down and close, in effect checking whether microammeter switch MS will remain open, until relay TRE2 has accumulated sufficient heat during the periods when relay RE1 is heating to close its contacts, and prevent relay TRE1 from further unlatching microammeter switch MS to check for completion of the titration. At this point the titration is complete, generation of titrant across electrodes 13 and 14 and energization of timer has ceased due to relay RE1 being held closed, and the apparatus remains in this state until switch S2 or switch S3 is opened.

The remaining sub-circuit in FIG. 2 is a direct current constant potential source for operation of relay RE1. This circuit operates in a manner similar to the operation of the constant potential circuit heretofore described, without the fluctuation compensation networks. One secondary winding of power transformer T3 is connected to the plates of full wave rectifier tube V7, while the other secondary winding is used to heat the cathode of the tube. Direct current energy having a ripple or alternating component is obtained from the cathode of tube V7 and is conducted to capacitance C6 and filter choke T4. The center tap of the winding of power transformer T3 that is connected to the plates of tube V7, is connected by lead 57 to the other connection of capacitance C7. The rippled direct current, with its alternating current component diminished by C6 and further smoothed by filter choke T4, is conducted to capacitance C7 where practically all the remaining ripple is removed. The blocked direct current component is conducted by lead 56 and resistance R14 to the plate of voltage regulator tube V8. The cathode of that tube is connected to the plate of voltage regulator tube V9. The cathode of tube V9 is connected over lead 57 to capacitances C6 and C7, and to the center tap of the winding of power transformer T3. Lead 49 conducts the constant direct current potential from voltage regulator tubes V8 and V9, through switch 52, lead 48, microammeter switch MS, lead 50, contacts of relay RE2, and lead 51 to the winding of relay RE1. The other end of the winding of that relay is coupled through line 52 and resistance R13 to the plate of tube V8. Thus the winding of relay RE1 is supplied with a constant direct current potential when switch S2, microammeter switch MS and relay RE2 are all closed.

While components of widely different ratings may be used in the apparatus of the present invention, the following constants are presented as an example of the ratings of the suitable components, and together constitute a specific embodiment of this invention:

*Tubes.*—V1=5U4G; V2 and V3=6Y6G; V4 and V5=OB2; V6=12AU7; V7=5Y3GT; and V8 and V9=OD3.

*Meters.*—M1=0–200 milliamperes; M2=0–50 microamperes, with microammeter switch MS contact controlled by M2.

*Relays.*—RE1=triple pole, double throw, 10,000 ohm winding; TRE1=thermodelay, 2 second, normally closed, 115 volts, 60 cycle A.C., such as Amperite No. 115C2; TRE2=thermodelay, 15 second, normally open, 115 volts, 60 cycle A.C., such as Amperite No. 115N015; and RE2=double pole, double throw, 115 volts, 60 cycle A.C.

*Switches.*—S3=double pole, single throw toggle switch; S1=triple-gang, triple pole, 5-position rotary switch; and S2=triple pole-double throw toggle switch.

*Lamps.*—L1–L6=all 120 volts A.C., 6-watt lamps.

*Capacitances.*—C1, C2 and C3=16 microfarads, 500 W.V. dry electrolytic; C4=0.15 microfarad, 600 W.V.; C5=0.1 microfarad, 600 W.V.; C6 and C7=8 microfarads.

*Resistances.*—R1=90 ohms; R2 and R5=100 ohms; R3=0.3 megohm; R4=510 ohms; R6=0.15 megohm; R7=0.1 megohm potentiometer; R8=43,000 ohms; R9=9,100 ohms; R10=0.25 megohm; R11=30 megohms; R12=30,000 ohms; R13=5,000 ohms; R14=22,000 ohms; R15=50,000 ohms potentiometer.

*Battery.*—B1=1.5 volts D.C.

The following example is illustrative of the operation of the titrator of the present invention.

Into the polypropylene beaker represented by 10 in FIG. 1, was placed 150 ml. of a 1.0 N aqueous solution of potassium bromide (280 ml.) as the titration reagent in a solvent mixture comprising glacial acetic acid (600 ml.), methanol (260 ml.) and mercuric acetate (2 g.). A magnetic stirring bar was also added to the beaker, which was placed on a magnetic stirrer. A polypropylene beaker cap holding the 4 platinum wire electrodes, one of which was surrounded by a glass tube sealed at the bottom by a fritted glass disc, was fitted over the beaker so that the electrodes were partially immersed in the titration solution.

The electrodes were connected to the apparatus embodied in FIG. 2 and heretofore described, having component ratings also heretofore described. Alternating current source E was rated at 115–120 volt A.C. The current selector switch S1 was set in the 3-position. Main power switch S3 was switched on with switch S2 in the off position, and a period of 10 minutes was allowed for the apparatus to warm up and reach equilibrium. The magnetic stirrer was turned on and adjusted to obtain rapid stirring without a vortex. The microammeter M2 indicated a current of 0–2 microampere was flowing between electrodes 17 and 18. Microammeter switch MS was adjusted so that when the indicated current reached 5 microamperes, the switch would close.

Titration switch S2 was turned on and current was passed to the titration reagent until excess titrant (bromine gas) appeared in the titration solution and the titration automatically stopped. Titration switch S2 was turned off. The timer was reset to zero, and 37 microliters of a solution of 10.00% by weight cyclohexene in reagent grade benzene (bromine number=0) was added to beaker 10. Standard method titration of the 10.00% cyclohexene solution indicated a bromine number of 19.50.

Titration switch S2 was turned on and the titration proceeded through several end-point indications until the apparatus automatically shut off. The timer read 19.50, the bromine number of the titrand solution. The titration apparatus was first calibrated by performing the titration with an arbitrarily chosen sample size and adjusting to the correct sample size according to the formula $$\text{sample size} = \frac{19.50}{\text{Timer reading}} \times \text{arbitrarily chosen sample size in microliters}$$

Upon calibration, the apparatus indicated the bromine number of the solution to 19.50 on successive titrations.

The titration was repeated using 4 microliters of pure cyclohexane (bromine number=194.6) as the titrand in place of the 37 microliters of 10% cyclohexene solution. After calibration by the above formula, the apparatus indicated 194.6 on the timer on successive titrations.

The bromine number is described by the equation:

$$\text{Bromine number} = 0.083 \frac{It}{w}$$

wherein:

I is the generating current in amperes.
t is the generating time in seconds.
w is the sample weight in grams.

Thus when the generating current is held constant at 35 amperes and the sample weight is 0.03 gram (approximately 4 microliters), the equation reduces to:

Bromine number = generation time in seconds

The sample size may be varied to complete the titration within a reasonable length of time. For example, a sample size of 0.29 gram (approximately 33 microliters) may be selected with a titrant generating current of 35 amperes. The equation then reduces to $$\text{Bromine number} = \frac{\text{generation time in seconds}}{10}$$

It is readily understood that determinations other than bromine numbers, such as other halogen numbers, or other properties or composition characteristics can be performed using the apparatus of the present invention by varying the electrodes, the titration reagent, the level of the current, and other variables.

While only a particular embodiment of the invention has been described and illustrated, it is manifest that alterations and modifications may be made therein. It is, therefore, the intention in the appended claims to cover all such modifications and alterations as may fall within the true spirit and scope of the invention.

I claim:

1. In an automatic titration apparatus including a titrating vessel for holding both a titrand and a titration reagent normally unreactive with the titrand and, responsive to passage of electrical energy through said reagent, operable to release a titrant reactable with the titrand;

electrical energy input means disposed in said vessel for transferring electrical energy to the titration reagent;

measuring means for registering a value related to the amount of energy transferred to the reagent and thus related to the amount of titrant released;

electrical energy output means disposed in said vessel;

detecting means coupled to said output means for indicating an energy level of a given value during the titration process and for indicating an energy level of a second value substantially different from said given value resulting from the presence of excess titrant;

switching means coupled to said detecting means and operable responsive to detection of excess titrant to interrupt the transfer of electrical energy to the input means;

first time delay means coupled to said detecting means so as to provide another indication of the energy level at said output means after the expiration of a predetermined time interval to determine if the excess titrant indication is still present and thereby determine if the true end point of the titration process has been reached;

automatic means for restarting the titration process if the end point is not indicated at the expiration of said predetermined time period and for repeatedly restarting the titration process;

and second time delay means coupled to the first time delay means so as to accumulate heat energy from the first time delay means until a predetermined value is reached and to stop the said first time delay means from providing another indication of the energy level at said output means after the value is reached, and coupled to said automatic means for restarting the titration process so as to stop the said automatic means after the said value is reached.

2. In an automatic titration apparatus including a titrating vessel for holding both a titrand and a titration reagent normally unreactive with the titrand and, responsive to passage of an electric current through said reagent, operable to release a titrant reactable with the titrand;

input means disposed in said vessel for passing an electric current through the titration reagent;

measuring means for registering a value related to the amount of current passed through the reagent and thus related to the amount of titrant released;

output means disposed in said vessel;

detecting means coupled to said output means for indicating a signal level of given value during the titration process and for indicating a signal level of a second value substantially different from said given value resulting from the presence of excess titrant;

switching means coupled to said detecting means and operable responsive to detection of excess titrant to interrupt the passage of electric current through the reagent;

first time delay means coupled to said detecting means so as to provide another indication of the signal level at said output means after the expiration of a predetermined time period to determine if the excess titrant indication is still present and thereby determine if the end point of the titration process has been reached;

automatic means for restarting the titration process if the true end point is not indicated at the expiration of said predetermined time period and for repeating the titration process;

and second time delay means coupled to the first time delay means so as to accumulate heat energy from the first time delay means until a predetermined value is reached and to stop the said first time delay means from providing another indication of the signal level at the output means after the value is reached, and coupled to said automatic means for re-starting the titration process so as to stop the said automatic means after the said value is reached.

3. In an automatic titration apparatus including a titrating vessel for holding both a titrand and a titration reagent normally unreactive with the titrand and, responsive to passage of electrical energy at a constant level through said reagent, operable to release a titrant reactable with the titrand, the rate of titrant release being related to the level of electrical energy passage;

electrical energy input means disposed in said vessel for transferring electrical energy to the titration reagent;

measuring means for registering a value related to the amount of energy passed through the reagent and thus related to the amount of titrant released;

electrode means disposed in said vessel;

detecting means coupled to said electrode means for indicating a current level of given value during the titration process and for indicating a current level of a second value substantially different from said given value resulting from the presence of excess titrant;

switching means coupled to said detecting means and operable responsive to indication of a current level of said second value to interrupt the transfer of electrical energy to the input means;

first time delay means coupled to said detecting means so as to provide another indication of the current level at said electrode means after the expiration of a predetermined time period to determine if the excess titrant indication is still present and thereby determine if the true end point of the titration process has been reached;

automatic means for restarting the titration process responsive to indication of a current level of said given value at the electrode means at the expiration of said predetermined time period and for repeating the titration process;

and second time delay means coupled to the first time delay means so as to accumulate heat energy from the first time delay means until a predetermined value is reached and to stop the said first time delay means from providing another indication of the current level at the said electrode means after the value is reached, and coupled to the said automatic means for restarting the titration process so as to stop the said automatic means after the said value is reached.

4. In an automatic titration apparatus including a titrating vessel for holding both a titrand and a titration reagent normally urneactive with the titrand and, responsive to passage of an electric current through said reagent, operable to release a titrant reactable with the titrand;

input electrode means disposed in said vessel for passing an electric current of constant level through the titration reagent;

measuring means for registering the time period during which the electric current is passed through the reagent and during which titrant is released;

output electrode means disposed in said vessel;

detecting means coupled to said output electrode means for sensing a first low level current during the titration process and for sensing a second current of a level significantly larger than said low level resulting from the presence of excess titrant in the vessel;

switching means coupled to said detecting means and operable responsive to detection of excess titrant to interrupt the passage of electric current through the input electrode means and to deenergize said measuring means;

first time delay means coupled to said detecting means so as to provide another indication of the current level at said output electrode means after the expiration of a predetermined time period to determine if the second current level indication is still present and thereby determine if the true end point of the titration process has been reached;

automatic means for restarting the titration process responsive to sensing of said first low level current at the end of said predetermined time period;

and second time delay means coupled to the first time delay means so as to accumulate heat energy from the first time delay means until a predetermined value is reached, and to stop the said first time delay means from providing another indication of the current level at said output electrode means after the value is reached, and coupled to the said automatic means for restarting the titration process so as to stop the said automatic means after the said value is reached.

5. In an automatic titration apparatus including a titration vessel for holding both a titrand and a titration reagent normally unreactive with the titrand and, responsive to passage of an electric current through said reagent, operable to release a titrant reactable with the titrand;

a pair of input electrodes disposed in said vessel;

time indicating means;

first switching means for both passing an electric current of constant level through said pair of input electrodes and for energizing said time indicating means;

a pair of sensing electrodes disposed in said vessel;

detecting means coupled to said sensing electrodes normally maintained in a first state resulting from the passage of a first current of given level during the titration process and operable to a second state resulting from the passage of a second current of a level substantially larger than said given level when excess titrant is present in the vessel;

second switching means coupled to said detecting means and operable responsive to passage of said second current to both interrupt the passage of electric current through said input electrodes and to deenergize said time indicating means;

first time delay means coupled to said detecting means so as to provide an indication of the current level at said sensing electrodes at the expiration of a predetermined time period;

automatic means for restarting the titration process if the current level at said sensing electrodes has dropped to said given level at the expiration of said predetermined time interval and for repeating the titration process;

and second time delay means coupled to said first time delay means so as to accumulate heat energy from the first time delay means until a predetermined value is reached and to stop the first time delay means from providing another indication of current level at said sensing electrodes after the value is reached, and coupled to said automatic means for restarting the titration process so as to stop the said automatic means after the said value is reached.

References Cited by the Examiner

UNITED STATES PATENTS

| | | | |
|---|---|---|---|
| 2,928,782 | 3/1960 | Leisey | 204—195 |
| 2,950,177 | 8/1960 | Brown et al. | 23—253 |
| 2,950,178 | 8/1960 | Halfter et al. | 23—253 |
| 2,999,797 | 9/1961 | Campbell | 204—195 X |

MORRIS O. WOLK, *Primary Examiner.*

J. SCOVRONEK, *Assistant Examiner.*